United States Patent
Kim et al.

(10) Patent No.: US 8,948,300 B2
(45) Date of Patent: Feb. 3, 2015

(54) METHOD AND DEVICE FOR PRECODING IN WIRELESS COMMUNICATION SYSTEM

(75) Inventors: Ki Jun Kim, Anyang-si (KR); Sung Yoon Cho, Anyang-si (KR); Dong Ku Kim, Anyang-si (KR); Jin Young Jang, Anyang-si (KR); Byoung Hoon Kim, Anyang-si (KR); Hyuk Jin Chae, Anyang-si (KR)

(73) Assignees: LG Electronics Inc., Seoul (KR); Industry-Academic Cooperation Foundation, Yonsei University, Seoul (KR)

( * ) Notice: Subject to any disclaimer, the term of this patent is extended or adjusted under 35 U.S.C. 154(b) by 5 days.

(21) Appl. No.: 13/880,540

(22) PCT Filed: Sep. 7, 2011

(86) PCT No.: PCT/KR2011/006613
§ 371 (c)(1),
(2), (4) Date: Apr. 19, 2013

(87) PCT Pub. No.: WO2012/053740
PCT Pub. Date: Apr. 26, 2012

(65) Prior Publication Data
US 2013/0208825 A1 Aug. 15, 2013

Related U.S. Application Data

(60) Provisional application No. 61/405,219, filed on Oct. 21, 2010.

(51) Int. Cl.
*H04L 25/49* (2006.01)
*H04B 7/04* (2006.01)
(Continued)

(52) U.S. Cl.
CPC .......... *H04B 7/0456* (2013.01); *H04L 25/0391* (2013.01); *H04L 25/03961* (2013.01);
(Continued)

(58) Field of Classification Search
CPC ....... H04L 1/0618; H04L 1/06; H04L 1/0003; H04L 1/0071; H04L 24/368; H03F 1/3247
USPC .......................... 375/267, 295–297; 455/63.1
See application file for complete search history.

(56) References Cited

U.S. PATENT DOCUMENTS

| | | | |
|---|---|---|---|
| 2007/0201576 A1* | 8/2007 | Hwang et al. | 375/267 |
| 2009/0010359 A1* | 1/2009 | Hwang et al. | 375/297 |
| 2010/0227562 A1* | 9/2010 | Shim et al. | 455/63.1 |

OTHER PUBLICATIONS

Schrammar et al., "Fair User Selection for Zero-Forcing Precoding in Multi-User MISO Systems," 2009 43rd Asilomar Conference on signals, Systems and computers, Nov. 4, 2009, pp. 1412-1415.
(Continued)

*Primary Examiner* — Sam K Ahn
*Assistant Examiner* — Janice Tieu
(74) *Attorney, Agent, or Firm* — Birch, Stewart, Kolasch & Birch, LLP (57) ABSTRACT

Provided is a method and a device for precoding in a wireless communication system. The method for precoding comprises the following steps: generating a first precoding matrix, $W_1$, for deciding the transmission power of one transmission antenna from a plurality of transmission antennas as the maximum power per antenna; generating a zero forcing (ZF) precoding matrix, $T_i$, which does not influence the transmission antenna having the power which is decided as the maximum power per antenna, based on the $(i-1)^{th}$ precoding matrix $W_{i-1}$ ($i=2, 3, \ldots$); determining $\alpha_i$, a constant which has the transmission power of one transmission antenna from the rest of the transmission antennas, which do not have the transmission power as the maximum power per antenna, based on the $T_i$; and generating the $i^{th}$ precoding matrix $W_i$ based on the $T_i$ and the $\alpha_i$.

14 Claims, 7 Drawing Sheets

(51) Int. Cl.
*H04L 25/03* (2006.01)
*H04L 5/00* (2006.01)
*H04L 25/02* (2006.01)

(52) U.S. Cl.
CPC ............ *H04B 7/0465* (2013.01); *H04B 7/0426* (2013.01); *H04L 5/0023* (2013.01); *H04L 25/0244* (2013.01); *H04L 2025/03414* (2013.01); *H04L 2025/03624* (2013.01)
USPC ............................ 375/296; 375/267; 375/295

(56) References Cited

OTHER PUBLICATIONS

Somekh et al., "Cooperative Multicell Zero-Forcing Beamforming in Cellular Downlink Channels," IEEE Transactions on Information Theory, vol. 55, No. 7, Jul. 2009, pp. 3206-3219.

Tran et al., "Multiuser Diversity for Successive Zero-Forcing Dirty Paper Coding: Greedy Scheduling Algorithms and Asymptotic Performance Analysis," IEEE Transactions on Signal Processing, vol. 58, No. 6, Jun. 2010, pp. 3411-3416.

\* cited by examiner

METHOD AND DEVICE FOR PRECODING IN WIRELESS COMMUNICATION SYSTEM

CROSS REFERENCE TO RELATED APPLICATIONS

This application is the National Phase of PCT/KR2011/006613 filed on Sep. 7, 2011, which claims priority under 35 U.S.C. §119(e) to U.S. Provisional Application No. 61/405,219 filed on Oct. 21, 2010, all of which are hereby expressly incorporated by reference into the present application.

BACKGROUND OF THE INVENTION

1. Field of the Invention

The present invention relates to wireless communications, and more specifically to a method and apparatus for precoding in a wireless communication system.

2. Related Art

MIMO technology can be used to improve the efficiency of data transmission and reception using multiple transmission antennas and multiple reception antennas. MIMO technology may include a space frequency block code (SFBC), a space time block code (STBC), a cyclic delay diversity (CDD), a frequency switched transmit diversity (FSTD), a time switched transmit diversity (TSTD), a precoding vector switching (PVS), spatial multiplexing (SM) for implementing diversity. An MIMO channel matrix according to the number of reception antennas and the number of transmission antennas can be decomposed into a number of independent channels. Each of the independent channels is called a layer or stream. The number of layers is called a rank.

The dirty paper coding scheme, one of MIMO technology, can reduce interference by removing other user's data which act as interference in advance from a transmitting unit, and is known to provide, in theory, maximum channel capacities in MIMO system. Reference can be made to M. H. M. Costa, "Writing on Dirty Paper," IEEE Trans. Inf. Theory, vol. 29, no. 3, pp. 439-441, May 1983, for the technology. The dirty paper coding scheme, however, is difficult to implement in practical system since the scheme requires lots of channel information and presents much complexity in calculation due to the nature of non-linear calculation. Therefore, various alternative methods that can implement the principle of dirty paper coding scheme by using linear calculation have been proposed. Among various alternative methods, a zero-forcing beamforming (ZF-BF) method uses the pseudo inverse matrix of a channel as a precoding matrix of a base station, taking advantage of the property that unit matrix is obtained by multiplying the channel with the precoding matrix. In other words, user pre-processing is carried out in the base station taking consideration of the interference between users. The ZF-BF method has the merit of relatively low complexity in calculation and ease of actual implementation through the use of only linear calculations.

To implement the ZF-BF method in real application, it is necessary to meet the condition of power constraint per base station. A method of power allocation maximizing sum rate while meeting the condition of power constraint per base station can be proposed. Also, power constraint per antenna or per antenna group including multiple antennas can be considered for implementing actual systems. As for the method considering per antenna power constraint, a pseudo-inverse with optimal power allocation (Pinv-Opt-PA) method allocates power so that sum rate is maximized while every antenna meets the condition of power constraint at the pseudo inverse matrix of the channel. For this method, reference can be made to F. Boccardi and H. Huang, "Optimum power allocation for the MIMO-BC zero-forcing precoder with per-antenna power constraints," in roc. Conf. Information Sciences Systems (CISS), March 2006. The Pinv-opt-PA method can be formularized to the problem of convex optimization which is widely known in optimization theory. As an alternative, a generalized inverse with optimal power allocation (Ginv-Opt-PA) method which allocates power so that sum rate is maximized while every antenna meets the power constraint at the generalized inverse matrix of the channel can be applied. For this method, reference can be made to Ami Wiesel, Yonina C. Eldar and Shlomo Shamai (Shitz), "Zero-Forcing Precoding and Generalized Inverses," IEEE Trans. Signal Process., vol. 56, no. 9, pp. 4409-4418, September 2008. The generalized inverse matrix of matrix A can be represented as the sum of pseudo inverse matrix of A and the matrix belonging to the null space of A, in which the generalized inverse matrix presents inverse matrix with degree of more freedom compared to the pseudo inverse matrix. The Ginv-Opt-PA method seeks optimum inverse matrix which can be easily applied for power allocation through generalized inverse matrix, and thus is known to be the optimal ZF precoding method considering per antenna power constraint. The Ginv-opt-PA method, however, relates to the problem of non-convex optimization in which solution can exist in special cases. Therefore, the method presents difficulty in implementing for actual systems.

Therefore, it is necessary to provide a method of precoding that can be easily implemented in real systems by reducing the amount of calculation while minimizing the difference in performance from conventional precoding methods.

SUMMARY OF THE INVENTION

The present invention provides a method and apparatus for precoding in a wireless communication system. The present invention proposes a method and apparatus for zero-forcing (ZF) precoding with low complexity considering per antenna power constraint in a downlink (DL) of a multiple-input multiple-output (MIMO) system.

In an aspect, a method of precoding in a wireless communication system is provided. The method includes (a) generating a first precoding matrix, $W_1$, for deciding transmit power of one transmission antenna among a plurality of transmission antennas as maximum power per antenna, (b) generating a zero forcing (ZF) precoding matrix, $T_i$, which does not affect the transmission antennas whose transmit powers are decided as the maximum power per antenna, based on $(i-1)$th precoding matrix $W_{i-1}$ ($i=2, 3, \ldots$), (c) determining a constant $\alpha_i$ which decides transmit power of one transmission antenna from the remaining transmission antennas whose transmit power are not determined as the maximum power per antenna, based on the $T_i$, and generating $i^{th}$ precoding matrix $W_i$ based on the $T_i$ and the $\alpha_i$. The steps from (b) to (d) are repeated by incrementing i by one until a condition $i=N_t-K+1$ is satisfied, where $N_t$ is the number of the plurality of transmission antennas, and K is a number of total users using a single reception antenna.

The maximum power per antenna may be determined as $P/N_t$, where P is total transmit power of a base station.

The $W_1$ may be defined as $W_1 = \alpha_1 T_1$, where $\alpha_1$ is a constant for deciding transmit power of a transmission antenna as the maximum power per antenna, and $T_1$ is a matrix which allocates transmit powers to all users evenly for a pseudo-inverse matrix of a channel matrix H.

The $W_i$ may be defined as $W_i = W_{i-1} + \alpha_i T_i$.

The $T_i$ may be defined as a matrix in which all columns of a pseudo inverse matrix of $H_i$ are normalized, where $H_i$ is a matrix in which all elements of columns corresponding to an index of the transmission antenna whose transmit power is determined as the maximum power per antenna in a channel matrix H are replaced with 0.

A final precoding matrix may be $W = W_{Nt-K+1}$.

In another aspect, a method of precoding in a wireless communication system is provided. The method includes (a) generating a first precoding matrix, $W_1$, for deciding transmit power of one antenna group among a plurality of antenna groups as maximum power per antenna group, (b) generating a zero forcing (ZF) precoding matrix, $T_i$, which does not affect the antenna groups whose transmit powers are decided as the maximum power per antenna group, based on (i−1)th precoding matrix $W_{i-1}$ (i=2, 3, ... ) (c) determining a constant $\alpha_i$ which decides transmit power of one antenna group from the remaining antenna groups whose transmit power are not determined as the maximum power per antenna group, based on the $T_i$, and (d) generating $i^{th}$ precoding matrix $W_i$ based on the Ti and the $\alpha_i$. The steps from (b) to (d) are repeated by incrementing i by one until the condition $i \leq N_G$, $N_t N_G - K - (i-1)N_t \geq N_t$ is satisfied, where $N_G$ is the number of the plurality of antenna groups, $N_t$ is a number of transmission antennas included in each antenna group, and K is a number of total users using a single reception antenna.

The maximum power per antenna group may be determined by the following Equation $tr(W^g(W^g)^H) \leq P$, where $W^g$ is a $N_t \times K$ submatrix composed only of elements of rows belonging to $Gr_g$ in W, $Gr_g$ is a $g^{th}$ antenna group including $N_t$ transmission antennas, and P is total transmit power of a base station.

The $W_1$ may be defined as $W_1 = \alpha_1 T_1$, where $\alpha_1$ is a constant for deciding transmit power of a antenna group as the maximum power per antenna group, and $T_1$ is a matrix which allocates transmit powers to all users evenly for a pseudo-inverse matrix of a channel matrix H.

The $W_i$ may be defined as $W_i = W_{i-1} + \alpha_i T_i$.

The $T_i$ may be defined as a matrix in which all columns of a pseudo inverse matrix of $H_i$ are normalized, where $H_i$ is a matrix in which all elements of columns corresponding to an index of the antenna group whose transmit power is determined as the maximum power per antenna group in a channel matrix H are replaced with 0.

In another aspect, an apparatus in a wireless communication system is provided. The apparatus includes a radio frequency (RF) unit for transmitting or receiving wireless signal, and a processor connected to the RF unit. The processor is configured for generating a first precoding matrix, $W_1$, for deciding transmit power of one transmission antenna among a plurality of transmission antennas as maximum power per antenna, generating a zero forcing (ZF) precoding matrix, $T_i$, which does not affect the transmission antennas whose transmit powers are decided as the maximum power per antenna, based on (i−1)th precoding matrix $W_{i-1}$ (i=2, 3, ... ), determining a constant $\alpha_i$ which decides transmit power of one transmission antenna from the remaining transmission antennas whose transmit power are not determined as the maximum power per antenna, based on the $T_i$, and generating $i^{th}$ precoding matrix $W_i$ based on the $T_i$ and the $\alpha_i$.

By using the method of the present invention, a method for precoding with ease of calculation and low complexity in actual application can be proposed under per antenna power constraint in an MIMO system.

DESCRIPTION OF EXEMPLARY EMBODIMENTS

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (evolved UTRA), and the like. IEEE 802.16m, an evolution of IEEE 802.16e, provides backward compatibility with a system based on IEEE 802.16e. The UTRA is part of a universal mobile telecommunications system (UMTS). 3GPP (3rd generation partnership project) LTE (long term evolution) is part of an evolved UMTS (E-UMTS) using the E-UTRA, which employs the OFDMA in downlink and the SC-FDMA in uplink. LTE-A (advanced) is an evolution of 3GPP LTE.

Figure 1:
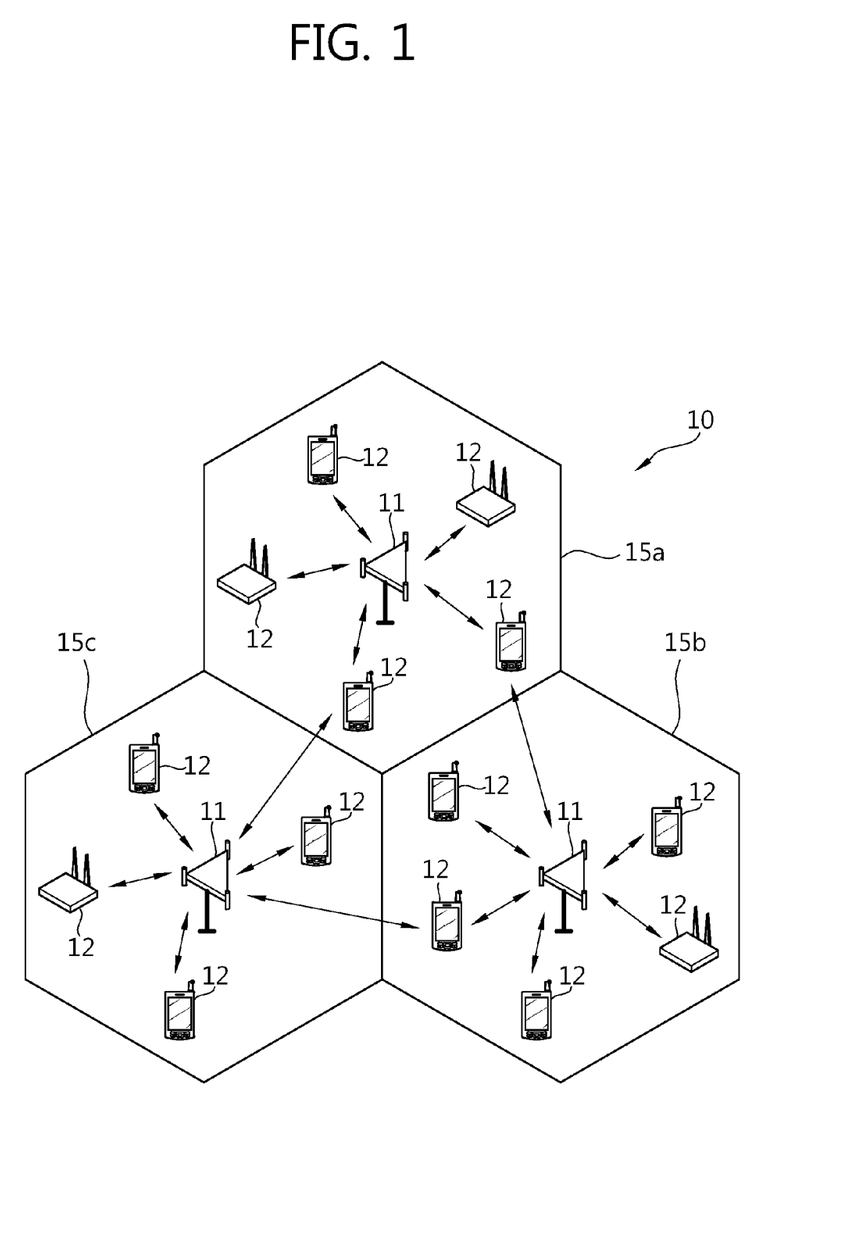
FIG. 1 shows a wireless communication system.

FIG. 1 shows a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as MS (mobile station), MT (mobile terminal), UT (user terminal), SS (subscriber station), wireless device, PDA (personal digital assistant), wireless modem, handheld device. The BS 11 generally refers to a fixed station that communicates with the UE 12 and may be called by other names such as eNB (evolved-NodeB), BTS (base transceiver system), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

First, the lemma, which is the basis of proposed method for precoding, will be described.

Assume a full row rank matrix H with size of $K \times N_t$ ($K < N_t$) and with all row vectors being linearly independent. If $H_0$ is a matrix with elements in some columns of H replaced with 0, the lemma of Equation 1 can be satisfied if $H_0$ is the full row rank matrix.

$$HH_0^\dagger = I_K \qquad \langle \text{Equation 1} \rangle$$

In Equation 1, $H_0^\dagger$ represents a pseudo inverse matrix of $H_0$, and $I_K$ a unit matrix with rank of K.

Equation 1 can be proved as follows. Since $H_0$ is the full row rank matrix, the pseudo inverse matrix of $H_0$, $H_0^\dagger = H_0^H (H_0 H_0^H)^{-1}$ exists satisfying $H_0 H_0^\dagger = I_K$. Here, $H_0^H$ represents a Hermitian transpose matrix or a conjugate transpose matrix of $H_0$. When one column among the columns with its elements of 0 in $H_0$ is $m^{th}$ column, the elements of $m^{th}$ row of $H_0^\dagger$ become 0 without losing generality. When the calculation of multiplication $HH_0^\dagger$ is carried out, elements in $m^{th}$ column of H and elements in $m^{th}$ row of $H_0^\dagger$ are multiplied, $m^{th}$ row of H does not affect the calculation of $HH_0^\dagger$ since the elements in $m^{th}$ row of $H_0^\dagger$ is all 0. $H_0$ can be generated by replacing all elements in these rows of H with 0, and so if $H_0^\dagger$ exists, the formula $HH_0^\dagger = H_0 H_0^\dagger = I_K$ is satisfied.

Equation 2 shows one example of Equation 1.

$$H = \begin{bmatrix} 0.5377 & -2.2588 & 0.3188 & -0.4336 \\ 1.8339 & 0.8622 & -1.3077 & 0.3426 \end{bmatrix}, \qquad \langle \text{Equation 2} \rangle$$

$$H_0 = \begin{bmatrix} 0.5377 & 0 & 0.3188 & 0 \\ 1.8339 & 0 & -1.3077 & 0 \end{bmatrix}$$

$$HH^\dagger = HH_0^\dagger$$

$$= \begin{bmatrix} 0.5377 & -2.2588 & 0.3188 & -0.4336 \\ 1.8339 & 0.8622 & -1.3077 & 0.3426 \end{bmatrix}$$

$$\begin{bmatrix} 1.0155 & 0.2476 \\ 0 & 0 \\ 1.4242 & -0.4175 \\ 0 & 0 \end{bmatrix}$$

$$= I$$

Now, a method of precoding will be described according to an embodiment of the present invention. Hereinafter, a channel matrix H representing a channel is a full row rank matrix, and the number of transmission antennas of the base station is $N_t$, the number of users using single reception antenna is K, and total transmit power of the base station is P. Therefore, each transmission antenna of the base station can use power with an amount of $P/N_t$. In the description, the amount of power of $P/N_t$ will be called maximum power per antenna. The present invention can be described as the algorithm carrying out iterations of maximum $N_t-K+1$. In each iteration, one transmission antenna which uses power with the amount of $P/N_t$, the maximum amount of power each transmission antenna can use, is found, and maximum of $N_t-K+1$ transmission antennas can be found in this way. A final precoding matrix is a sum of the precoding matrices generated in each iteration.

Figure 2:
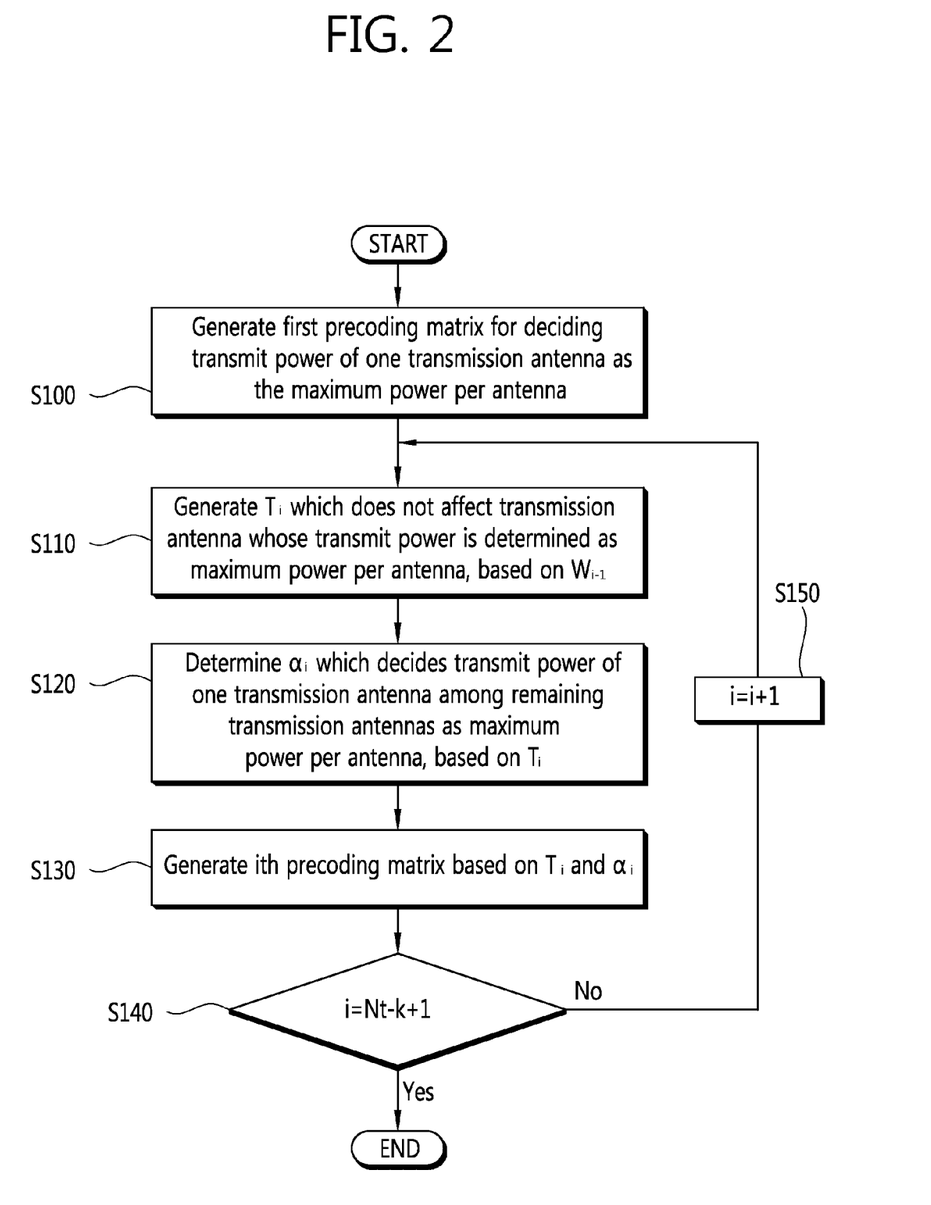
FIG. 2 shows an example of a precoding method according to an embodiment of the present invention.

FIG. 2 shows an example of a precoding method according to an embodiment of the present invention.

In step S100, the base station generates a first precoding matrix which decides transmit power of one transmission antenna from multiple transmission antennas as the maximum power per antenna. First, powers are allocated evenly to all users through a pseudo inverse matrix of a channel matrix, which is defined as $T_1$. The matrix $T_1$ corresponds to a ZF precoding matrix. The first precoding matrix thus created can be defined as $W_1 = \alpha_1 T_1$, and the constant $\alpha_1$ is determined so that the one transmission antenna using the maximum power per antenna at $T_1$ can use all the power under power constraint. The constant $\alpha_1$ can be determined by Equation 3.

$$\alpha_1 = \frac{1}{\max_m [(T_1)(T_1)^H]_{m,m}} \qquad \langle \text{Equation 3} \rangle$$

In Equation 3, $[A]_{m,n}$ represents an element of matrix A at $m^{th}$ row and $n^{th}$ column.

In step S110, the base station generates the ZF precoding matrix based on (i−1)th precoding matrix in a way that the generated matrix does not affect the transmission antenna determined for the maximum power per antenna in step S100. The step can start from i=2. In step S120, the base station determines the constant $\alpha_i$ based on the ZF precoding matrix so that the transmit power of one transmission antenna from the transmission antennas which have not been determined for the transmit power becomes the maximum power per antenna. In step S130, the base station generates $i^{th}$ precoding matrix based on the ZF precoding matrix and $\alpha_i$.

The generated $i^{th}$ precoding matrix can be defined as $W_i = W_{i-1} + \alpha_i T_i$. The matrix $H_i$ represents a matrix in which the elements of the row corresponding to the index of transmission antenna whose transmit power is determined as the maximum power per antenna in H are replaced with 0. The ZF precoding matrix, $T_i$, represents a matrix in which all rows of the pseudo inverse matrix of $H_i$ are normalized. The elements of rows corresponding to the index of the transmission antennas whose transmit power is determined as the maximum power per antenna in $T_i$ become 0 since the elements of rows corresponding to the index of the transmission antennas whose transmit power is determined as the maximum power per antenna in $H_i$ is all 0. Therefore, both $W_{i-1}$ and $W_i$ become the ZF precoding matrices regardless of the constant $\alpha_i$ according to the lemma of Equation 1. Also, since the rows in $T_i$ whose elements are all 0 and the rows in $W_{i-1}$ whose rows corresponding to the index of the transmission antenna using the maximum power per antenna are located at the same position, the elements of the rows in $W_{i-1}$ corresponding to the index of transmission antennas using the maximum power per antenna are the same as the elements of the rows in $W_i$ corresponding to the index of transmission antennas using the per antenna maximum power. Also, the transmit power of the transmission antenna which has already been determined to transmit with the maximum power per antenna is not affected by the constant $\alpha_i$.

The transmit power of a transmission antenna can be represented as the square of 2-norm of the row vector of $W_i$, and assuming that the transmit power is the same as the maximum power per antenna, $P/N_t$, the constant $\alpha_i$ can be calculated. Equation 4 represents the equation for obtaining the constant $\alpha_i$.

$$\|a + \alpha_i b\|^2 = \|b\|^2 \alpha_i^2 + (ab^H + ba^H)\alpha_i + \|a\|^2 = P/N_t \quad \langle\text{Equation 4}\rangle$$

$$\therefore \alpha_i = \frac{\left\{\begin{array}{c} -(ab^H + ba^H) + \\ \sqrt{(ab^H + ba^H)^2 - 4\|b\|^2(\|a\|^2 - P/N_t)} \end{array}\right\}}{\{2\|b\|^2\}}$$

In Equation 4, a represents the row vector of $W_{i-1}$, and b the row vector of $T_i$. The transmit power of another transmission antenna can be determined as the maximum power per antenna by calculating the constant $\alpha_i$ by using Equation 4.

The steps S110 through S130 are repeated until the condition $i=N_t-K+1$ is satisfied. In step S140, the condition $i \leq N_t-K+1$ is determined, and if i is smaller than or equal to $N_t-K+1$, i is incremented by 1 in step S150. By the lemma of Equation 1, H can maintain orthogonality with the pseudo inverse matrix of the matrix whose elements in maximum of $N_t-K$ rows are made to 0 if pseudo inverse matrix exists. In the case where the transmit power of another transmission antenna is determined as the maximum power per antenna by obtaining $\alpha_i$ by Equation 4, however, the transmit power of transmission antenna whose transmit power has not been determined can exceed per antenna transmit power. Therefore, a Greedy method of arranging transmit powers of each transmission antenna in the order of size in each step and calculating $\alpha_i$ sequentially until all transmission antennas satisfy the power constraint can be applied.

As described above, by using the proposed method of precoding, total of $N_t-K+1$ antennas comprising one transmission antenna obtained in the first step and $N_t-K$ antennas using the dimension of null space can use transmit power maximally under power constraint.

Table 1 shows a code of the algorithm implementing the proposed precoding method under power constraint for each transmission antenna.

TABLE 1

Line 1  Initialization: H, $S = \{\emptyset\}$, $S_{full} = \{1, \ldots, N_t\}$
Line 2  $i = 1$ Line 3
$$[G_1]_{m,n} = \begin{cases} 0 & m \neq n \\ 1 / \sqrt{(H^\dagger)^H H^-} & m = n \end{cases}$$

Line 4  $\alpha_1 = 1 / \max_m [(H^\dagger G_1)(H^\dagger G_1)^H]_{m,m}$

Line 5  $W_1 = \alpha_1 T_1$

Line 6  $S = \{\arg\max_m [T_1 T_1^H]_{m,m}\}$

Line 7  for $i = 2, \ldots, N_t - K + 1$

TABLE 1-continued

Line 8  Define $H_i$: $\text{col}(H_i, k) = \begin{cases} \text{col}(H, k) & k \notin S \\ 0 & k \in S \end{cases}$ Line 9  Define $G_i$: $[G_i]_{m,n} = \begin{cases} 0 & m \neq n \\ 1 / \sqrt{(H_i^\dagger)^H H_i^\dagger} & m = n \end{cases}$ Line 10  $T_i = H_i^\dagger G_i$
Line 11  Flag = 0
Line 12  while Flag == 0
Line 13  $\quad S_{rem} = S_{full} - S$ Line 14  $\quad l = \arg\max_{m \in S_{rem}} [W_{i-1} W_{i-1}^H]_{m,m}$ Line 15  $\quad a = \text{row}(W_{i-1}, l), b = \text{row}(T_i, l)$ Line 16  $\quad \alpha_i = \dfrac{-(ab^H + ba^H) + \sqrt{(ab^H + ba^H)^2 - 4\|b\|^2(\|a\|^2 - P/N_t)}}{2\|b\|^2}$ Line 17  $\quad W_i = W_{i-1} + \alpha_i T_i$ Line 18  $\quad$ if $\max_m [W_i W_i^H]_{m,m} \leq P/N_t$ Line 19  $\quad\quad S \leftarrow S \cup \{l\}$
Line 20  $\quad\quad$ Flag = 1
Line 21  $\quad$ else
Line 22  $\quad\quad S_{rem} \leftarrow S_{rem} - \{l\}$
Line 23  $\quad$ end
Line 24  end
Line 25  end In table 1, $\{.\}$ represents a set. In set operations, $A \cup B$ represents the union of the sets A and B. In set operations, calculation A-B represents relative complement of set A by set B. S is a set of indices of transmission antennas whose transmit power is determined as the maximum power per antenna. $S_{full}$ is a set of indices of all transmission antennas. $S_{rem}$ is a set comprised of the indices of transmission antennas whose transmit power is not determined as the maximum power per antenna. Expression col(H, m) means $m^{th}$ column of H and row(H, m) $m^{th}$ row of H.

Figure 3:
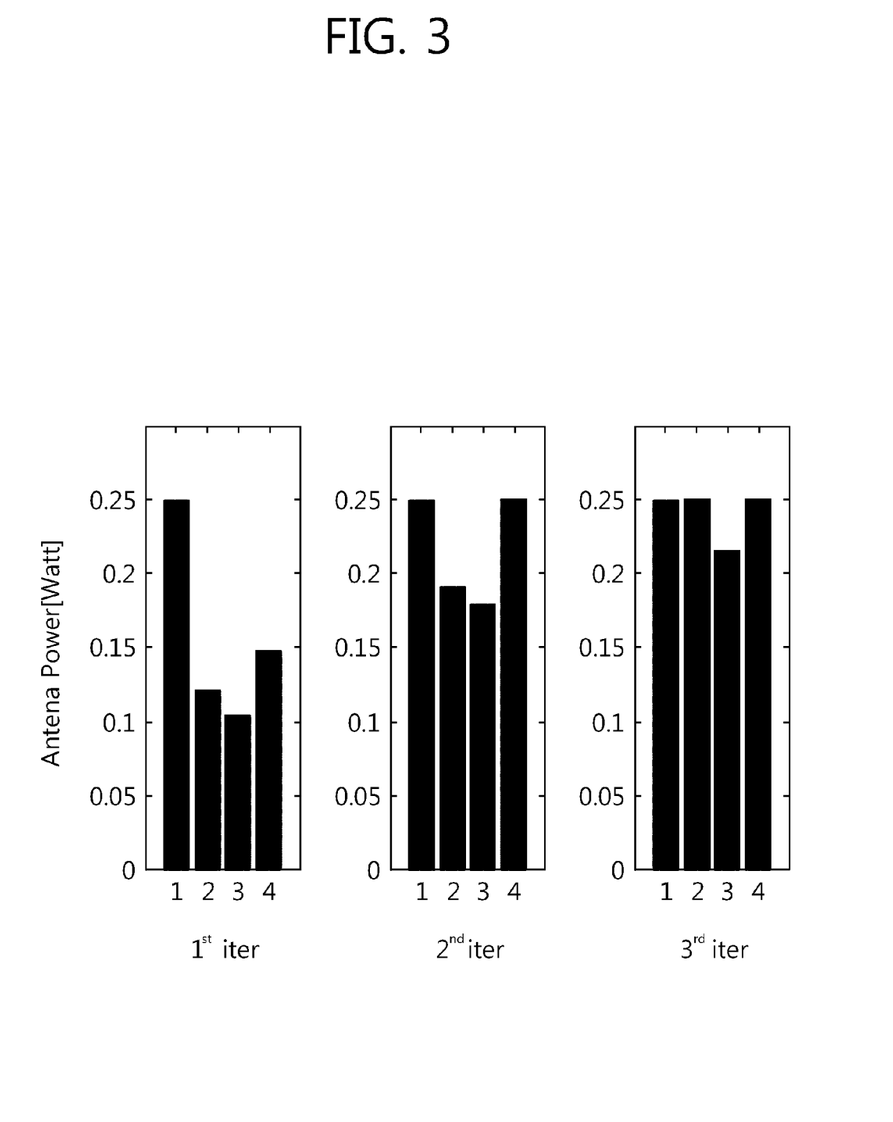
FIG. 3 shows an example showing the change of transmit power in transmission antennas according to the iteration of each algorithm of an embodiment of the present invention.

FIG. 3 shows an example showing the change of transmit power in transmission antennas according to the iteration of each algorithm of an embodiment of the present invention.

Referring to FIG. 3, with $N_t=4$, $K=2$ and $P=1$W, the transmit power of each transmission antenna is determined at each iteration of the algorithm. At first iteration, the transmit power of the first transmission antenna is determined as the maximum power per antenna of 0.25 W ($P/N_t=\frac{1}{4}$). At second iteration, the transmit power of the 4th transmission antenna is also determined as 0.25 W without affecting the transmit power of the first transmission antenna whose transmit power has already been determined as 0.25 W. At third iteration, the transmit power of the second transmission antenna is also determined as 0.25 W without affecting the transmit power of the first and fourth transmission antennas whose transmit power have already been determined as 0.25 W.

Although the method according to an embodiment of the present invention has been applied to the case where the transmit power for each transmission antenna is limited, the method according to an embodiment of the present invention can also be applied to the case where the transmit power for each transmission antenna group is limited.

Assuming that $N_G$ groups contain $N_t$ transmission antennas respectively, total number of transmission antennas is $N_t N_G$. For the sake of convenience, each group can be classified as in Equation 5.

$$G_{r1} = \{1, \ldots, N_t\}$$ ⟨Equation 5⟩

$$G_{r2} = \{N_t + 1, \ldots, 2N_t\}$$

$$\ldots$$

$$G_{rNG} = \{N_t(N_G - 1) + 1, \ldots, N_t N_G\}$$

When total transmit power per group is P, assuming that W is precoding matrix, transmit power constraint per group can be specified as in Equation 6.

$$tr(W^g(W^g)^H) \leq P$$ ⟨Equation 6⟩

In Equation 6, tr(A) is trace of matrix A. And $W^g$ is $N_t \times K$ submatrix composed of the elements in the rows of W which belong to $Gr_g$. In other words, precoding matrix W can be represented as in Equation 7.

$$W = \begin{bmatrix} W^1 \\ W^2 \\ \vdots \\ W^{N_G} \end{bmatrix}$$ ⟨Equation 7⟩

The $i^{th}$ precoding matrix generated can be defined as $W_i = W_{i-1} + \alpha_i T_i$, which is similar to the case where power per transmission antenna is limited. The matrix $H_i$ represents the matrix in which all elements of rows corresponding to the indexes of transmission antennas whose transmit power is determined as the maximum power per antenna group in channel matrix H are replaced with 0. $T_i$ represents the matrix in which every row of the pseudo inverse matrix of $H_i$ is normalized.

The transmit power of transmission antenna group can be represented as the square of Frobenius norm of matrix $W_i$ and, assuming that the transmit power is the same as the maximum power per antenna group P, the constant $\alpha_i$ can be calculated. Equation 8 shows the equation for obtaining the maximum power per antenna group constant $\alpha_i$.

$$\|A + \alpha_i B\|_F^2 = tr((A + \alpha_i B)(A + \alpha_i B)^H)$$ ⟨Equation 8⟩
$$= tr(BB^H)\alpha_i^2 + tr(AB^H + BA^H)\alpha_i + tr(AA^H)$$
$$= P$$

$$\alpha_i = \frac{-tr(AB^H + BA^H) + \sqrt{(tr(AB^H + BA^H))^2 - 4tr(BB^H)(tr(AA^H) - P)}}{2tr(BB^H)}$$

In Equation 8, A represents a submatrix of $W_{i-1}$, and B is a submatrix of $T_i$. $\|A\|_F$ represents Frobenius norm of A. By calculating the constant $\alpha_i$ through Equation 8, the transmit power of another transmission antenna group can be determined as the maximum power per antenna group.

TABLE 2

| | |
|---|---|
| Line 1 | Initialization: H, S = {∅}, $S_{full} = \{1, \ldots, N_G\}$ |
| Line 2 | i = 1 |
| Line 3 | $[G_1]_{m,n} = \begin{cases} 0 & m \neq n \\ 1/\sqrt{(H^\dagger)^H H^\dagger} & m = n \end{cases}$ |
| Line 4 | $T_1 = H^\dagger G_1$ |
| Line 5 | $\alpha_1 = 1 / \sqrt{\max_g tr(T_1^g (T_1^g)^H)}$ |
| Line 6 | $W_1 = \alpha_1 T_1$ |
| Line 7 | $S = \left\{ \underset{g}{\arg\max}\ tr(W_1^g(W_1^g)^H) \right\}$ |
| Line 8 | i = i + 1 |
| Line 9 | while i ≤ $N_G$ and $N_t N_g - K - (i - 1) N_t \geq N_t$ |
| Line 10 | Define $H_i$: $col(H_i, k) = \begin{cases} col(H, k), k \notin Gr_m & \text{where } m \in S \\ 0, k \in Gr_m & \text{where } m \in S \end{cases}$ |
| Line 11 | Define $G_i$: $[G_i]_{m,n} = \begin{cases} 0 & m \neq n \\ 1/\sqrt{(H_i^\dagger)^H H_i^\dagger} & m = n \end{cases}$ |
| Line 12 | $T_i = H_i^\dagger G_i$ |
| Line 13 | Flag = 0 |
| Line 14 | while Flag == 0 |
| Line 15 | $S_{rem} = S_{full} - S$ |
| Line 16 | $l = \underset{g \in S_{rem}}{\arg\max}\ tr(W_{i-1}^g (W_{i-1}^g)^H)$ |
| Line 17 | $A = W_{i-1}^l, B = T_i^l$ |

TABLE 2-continued

| Line 18 | $\alpha_i = \dfrac{-\mathrm{tr}(AB^H + BA^H) + \sqrt{(\mathrm{tr}(AB^H + BA^H))^2 - 4\mathrm{tr}(BB^H)(\mathrm{tr}(AA^H) - P)}}{2\mathrm{tr}(BB^H)}$ |
|---|---|
| Line 19 | $W_i = W_{i-1} + \alpha_i T_i$ |
| Line 20 | if $\max_m \mathrm{tr}(W_i^m (W_i^m)^H) \le P$ |
| Line 21 | $S \leftarrow S \cup \{l\}$ |
| Line 22 | Flag = 1 |
| Line 23 | else |
| Line 24 | $S_{rem} \leftarrow S_{rem} - \{l\}$ |
| Line 25 | end |
| Line 26 | end |
| Line 27 | end |
| Line 28 | $W = W_i$ |

In table 2, S is a set of indices of the antenna group whose transmit power is determined as the maximum power per antenna group. $S_{full}$ is a set of indices of all antenna groups. $S_{rem}$ is a set of indices of antenna groups whose transmit power is not determined as the maximum power per antenna group. $W^g$ is a matrix composed only of rows belonging to $Gr_g$ in W. The expression col(H, m) represents $m^{th}$ column of H.

Figure 4:
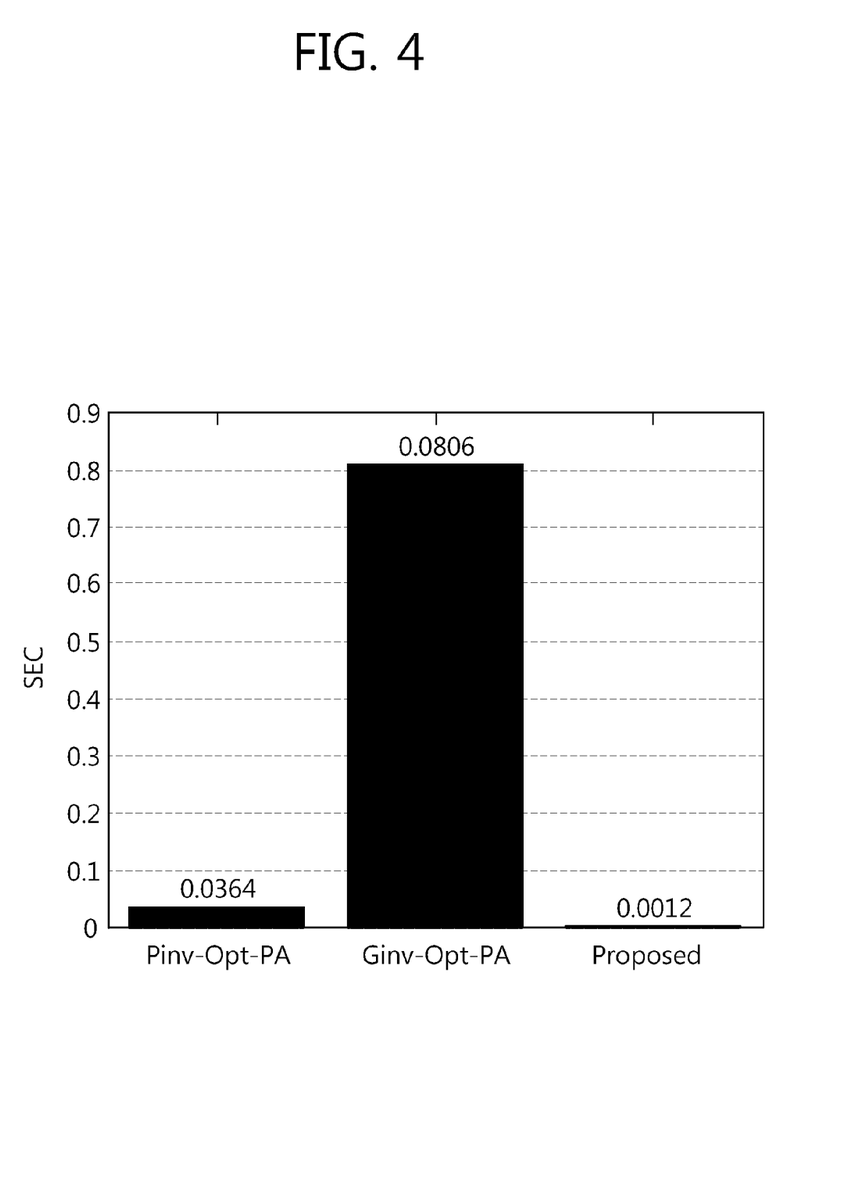
FIG. 4 is a graph showing the difference in average time of generating precoding matrix between proposed method of precoding and conventional method of precoding.

FIG. 4 is a graph showing the difference in average time of generating precoding matrix between proposed method of precoding and conventional method of precoding. Referring to FIG. 4, it can be seen that the method of precoding proposed by an embodiment of the present invention can generate precoding matrix more rapidly compared to the Pinv-Opt-PA method which can obtain solution relatively easily as well as the Ginv-Opt-PA method which adopts a calculation method with large complexity.

Figure 5:
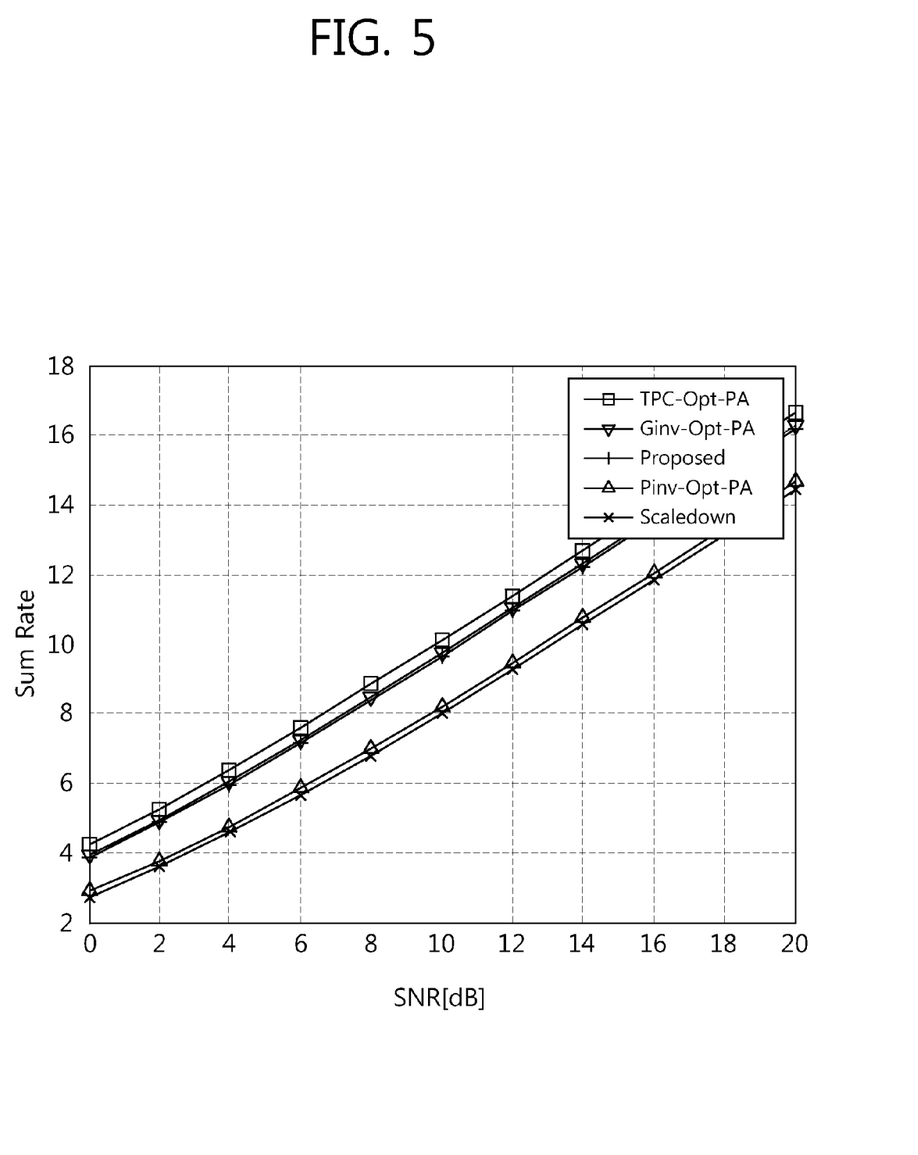
FIGS. 5 and 6 are graphs showing the sum rate by proposed method of precoding and conventional method of precoding.
Figure 6:
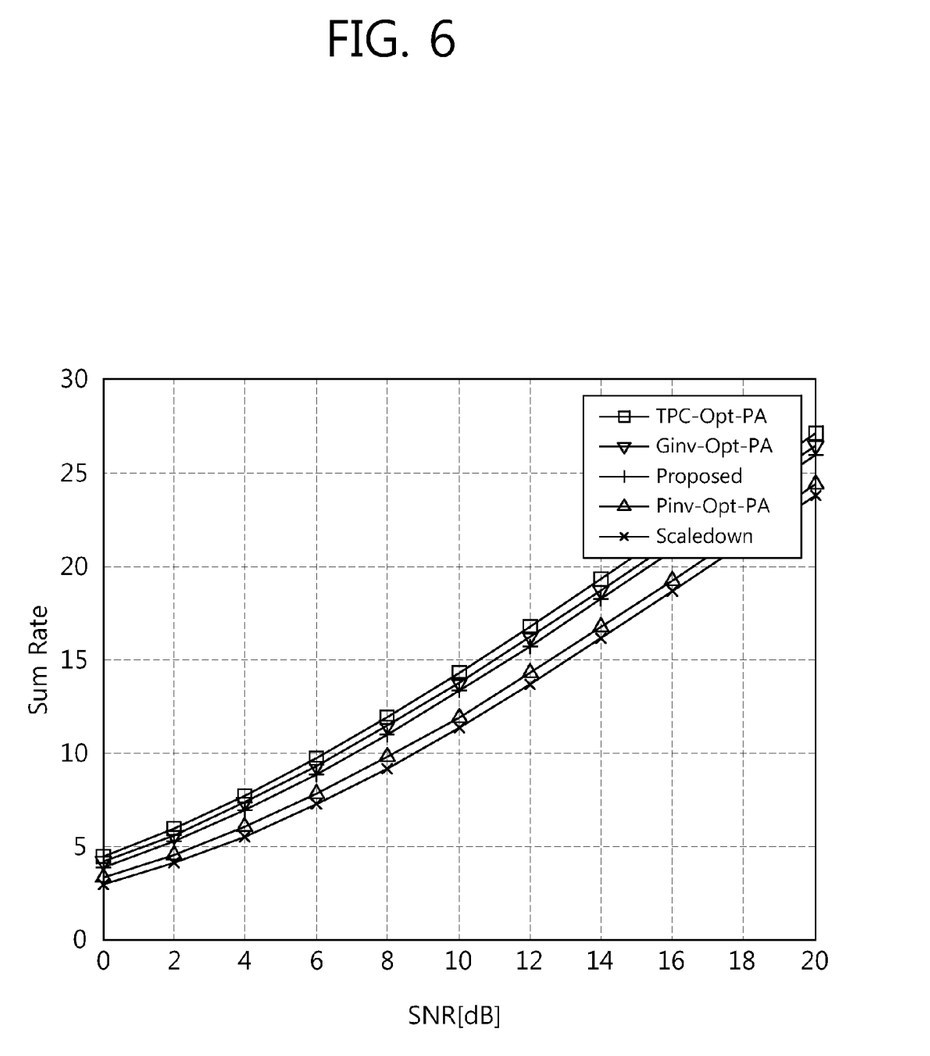

FIGS. 5 and 6 are graphs showing the sum rate by proposed method of precoding and conventional method of precoding. In FIGS. 5 and 6, TPC-Opt-PA represents sum rate by the method of precoding under average transmit power constraint (total power constraint), and scaledown represents the method of transmission with transmit power lowered so that all transmission antennas satisfy per antenna power constraint in ZF precoding method. Also, in FIG. 5, $N_t$=8 and K=2, and in FIG. 6, $N_t$=8 and K=4. Referring to FIGS. 5 and 6, it can be seen that proposed method of precoding presents little loss in performance compared to the Ginv-Opt-PA method which presents optimal performance under per antenna power constraint. Also, difference in performance between proposed method of precoding and the Ginv-Opt-PA method decreases as the number of users is reduced.

Referring to FIGS. 4 to 6, it can be seen that the proposed method of precoding shows comparable performance compared to the Ginv-Opt-PA method and provides excellent efficiency by adopting the method that can greatly reduce the amount of calculation.

Figure 7:
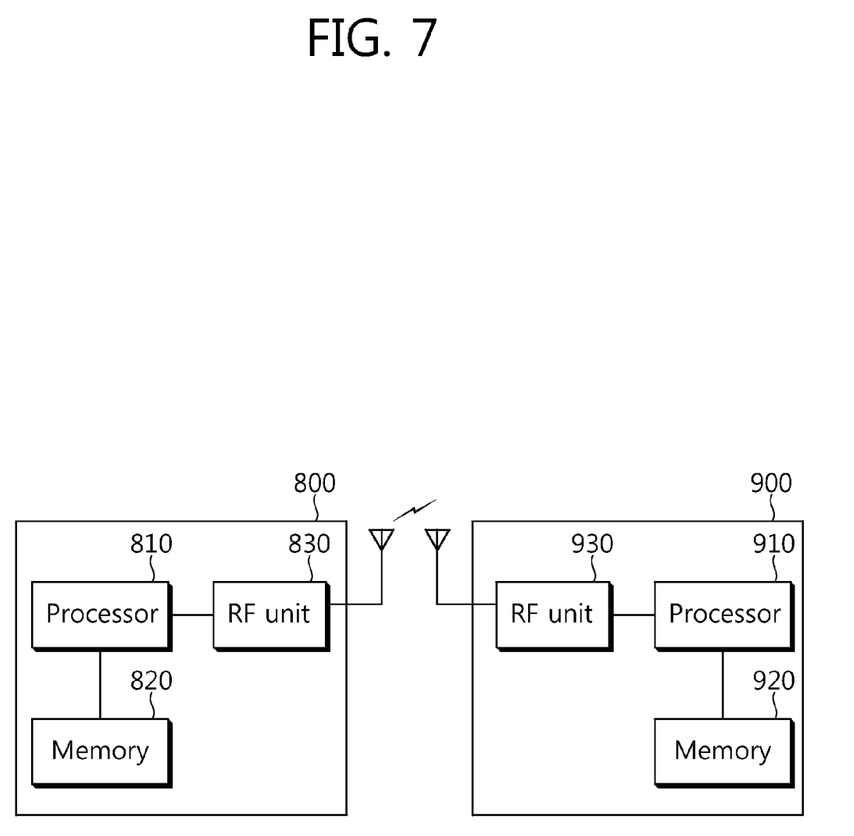
FIG. 7 is a block diagram showing wireless communication system to implement an embodiment of the present invention.

FIG. 7 is a block diagram showing wireless communication system to implement an embodiment of the present invention.

A BS 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method of precoding in a wireless communication system, the method comprising:
   (a) generating a first precoding matrix, $W_1$, for deciding transmit power of one transmission antenna among a plurality of transmission antennas as maximum power per antenna;
   (b) generating a zero forcing (ZF) precoding matrix, $T_i$, which does not affect the transmission antenna whose transmit power is decided as the maximum power per antenna, based on (i−1)th precoding matrix $W_{i−1}$ (i=2, 3, . . . );
   (c) determining a constant $\alpha_i$ which decides transmit power of one transmission antenna from the remaining transmission antennas whose transmit power are not determined as the maximum power per antenna, based on the $T_i$; and
   (d) generating $i^{th}$ precoding matrix $W_i$ based on the $T_i$, and the $\alpha_i$,
   wherein the steps from (b) to (d) are repeated by incrementing i by one until a condition $i=N_t−K+1$ is satisfied,
   where $N_t$ is the number of the plurality of transmission antennas, and K is a number of total users using a single reception antenna.

2. The method of claim 1, wherein the maximum power per antenna is determined as $P/N_t$,
   where P is total transmit power of a base station.

3. The method of claim 1, wherein the $W_1$ is defined as $W_1 = \alpha_1 T_1$,
   where $\alpha_1$ is a constant for deciding transmit power of a transmission antenna as the maximum power per antenna, and $T_1$ is a matrix which allocates transmit powers to all users evenly for a pseudo-inverse matrix of a channel matrix H.

4. The method of claim 1, wherein the $W_i$ is defined as $W_i = W_{i−1} + \alpha_i T_i$.

5. The method of claim 1, wherein the $T_i$ is defined as a matrix in which all columns of a pseudo inverse matrix of $H_i$ are normalized,
   where $H_i$ is a matrix in which all elements of columns corresponding to an index of the transmission antenna whose transmit power is determined as the maximum power per antenna in a channel matrix H are replaced with 0.

6. The method of claim 1, wherein the $\alpha_i$ is calculated by the following Equation:

$$\alpha_i = \frac{\{-(ab^H + ba^H) + \sqrt{(ab^H - ba^H)^2 - 4\|b\|^2(\|a\|^2 - P/N_t)}\}}{\{2\|b\|^2\}},$$

where a is a row vector of the $W_{i−1}$, b is a row vector of the $T_i$, $a^H$ is a Hermitian transpose of a, and $\|a\|$ is a 2-norm of a.

7. The method of claim 1, wherein a final precoding matrix is $W = W_{Nt−K+1}$.

8. A method of precoding in a wireless communication system, the method comprising:
   (a) generating a first precoding matrix, $W_1$, for deciding transmit power of one antenna group among a plurality of antenna groups as maximum power per antenna group;
   (b) generating a zero forcing (ZF) precoding matrix, $T_i$, which does not affect the antenna group whose transmit power is decided as the maximum power per antenna group, based on (i−1)th precoding matrix $W_{i−1}$ (i=2, 3, . . . );
   (c) determining a constant $\alpha_i$ which decides transmit power of one antenna group from the remaining antenna groups whose transmit power are not determined as the maximum power per antenna group, based on the $T_i$; and
   (d) generating $i^{th}$ precoding matrix $W_i$ based on the Ti and the $\alpha_i$,
   wherein the steps from (b) to (d) are repeated by incrementing i by one until the condition $i \leq N_G$, $N_t N_G − K − (i−1) N_t \geq N_t$ is satisfied,
   where $N_G$ is the number of the plurality of antenna groups, $N_t$ is a number of transmission antennas included in each antenna group, and K is a number of total users using a single reception antenna.

9. The method of claim 8, wherein the maximum power per antenna group is determined by the following Equation:

$$tr(W^g(W^g)^H) \leq P,$$

where $W^g$ is a $N_t \times K$ submatrix composed only of elements of rows belonging to $Gr_g$ in W, $Gr_g$ is a $g^{th}$ antenna group including $N_t$ transmission antennas, P is total transmit power of a base station, and $tr(W^g(W^g)^H)$ is a trace of matrix $W^g(W^g)^H$.

10. The method of claim 8, wherein the $W_1$ is defined as $W_1 = \alpha_1 T_1$,
    where $\alpha_1$ is a constant for deciding transmit power of a antenna group as the maximum power per antenna group, and $T_1$ is a matrix which allocates transmit powers to all users evenly for a pseudo-inverse matrix of a channel matrix H.

11. The method of claim 8, wherein the $W_i$ is defined as $W_i = W_{i−1} + \alpha_i T_i$.

12. The method of claim 8, wherein the $T_i$ is defined as a matrix in which all columns of a pseudo inverse matrix of $H_i$ are normalized,
    where $H_i$ is a matrix in which all elements of columns corresponding to an index of the antenna group whose transmit power is determined as the maximum power per antenna group in a channel matrix H are replaced with 0.

13. The method of claim 8, wherein the $\alpha_i$ is calculated by the following Equation:

$$\alpha_i = \frac{-tr(AB^H + BA^H) + \sqrt{(tr(AB^H + BA^H))^2 - 4tr(BB^H)(tr(AA^H) - P)}}{2tr(BB^H)},$$

where A is a submatrix of the $W_{i−1}$, B is a submatrix of the $T_i$, $A^H$ is a Hermitian transpose of A, and tr(A) is a trace of A.

14. An apparatus in a wireless communication system, the apparatus comprising:
    a radio frequency (RF) unit configured to transmit or receive a wireless signal; and
    a processor connected to the RF unit,
    wherein the processor is configured to:
    (a) generate a first precoding matrix, $W_1$, for deciding transmit power of one transmission antenna among a plurality of transmission antennas as maximum power per antenna;
    (b) generate a zero forcing (ZF) precoding matrix, $T_i$, which does not affect the transmission antenna whose transmit power is decided as the maximum power per antenna, based on (i−1)th precoding matrix $W_{i-1}$ (i=2, 3, . . . );

(c) determine a constant $\alpha_i$ which decides transmit power of one transmission antenna from the remaining transmission antennas whose transmit power are not determined as the maximum power per antenna, based on the $T_i$; and (d) generate $i^{th}$ precoding matrix $W_i$ based on the $T_i$ and the $\alpha_i$, wherein (b), (c) and (d) are repeated by incrementing i by one until a condition i=$N_t$−K+1 is satisfied, and where $N_t$ is a number of the plurality of transmission antennas, and K is a number of total users using a single reception antenna.

* * * * *